INVENTOR.
ARTHUR CAROL SANFORD
BY Hamilton & Cook
ATTORNEYS

Dec. 3, 1968 A. C. SANFORD 3,413,703
METHOD FOR FABRICATING TRUSSES IN HORIZONTAL POSITION
Filed July 26, 1966 7 Sheets-Sheet 2

INVENTOR.
ARTHUR CAROL SANFORD
BY Hamilton & Cook
ATTORNEYS

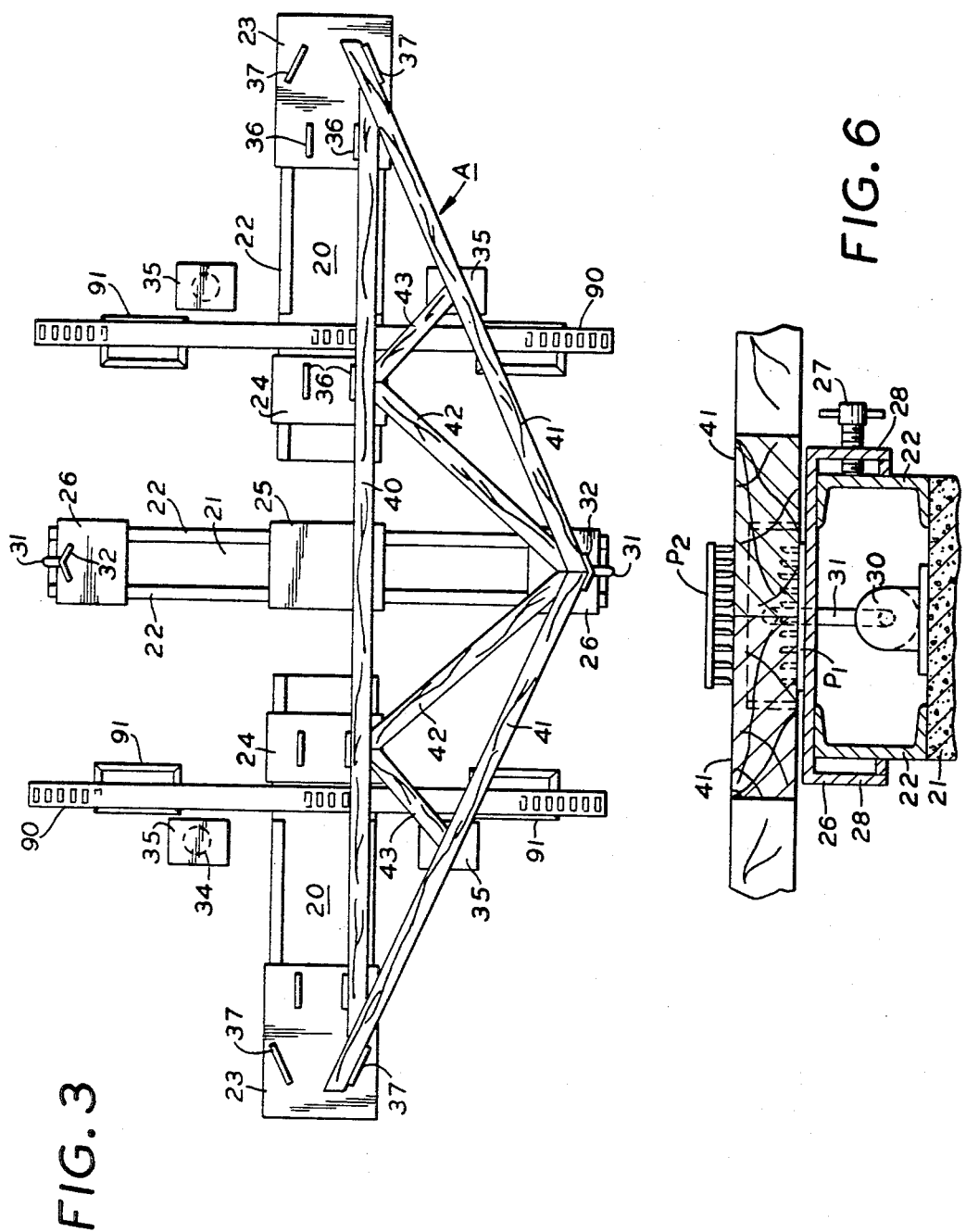

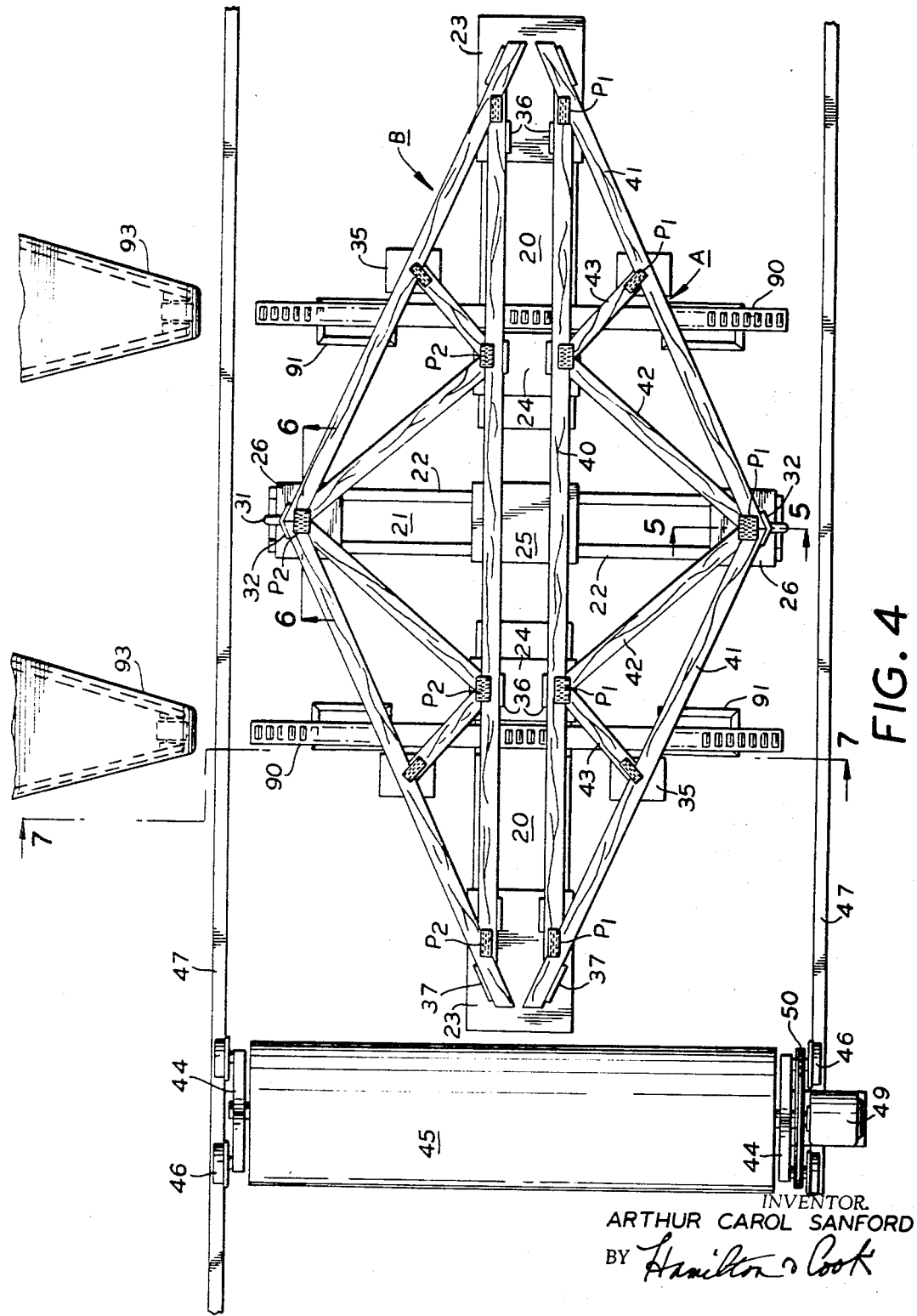

Dec. 3, 1968            A. C. SANFORD            3,413,703
METHOD FOR FABRICATING TRUSSES IN HORIZONTAL POSITION
Filed July 26, 1966            7 Sheets-Sheet 5
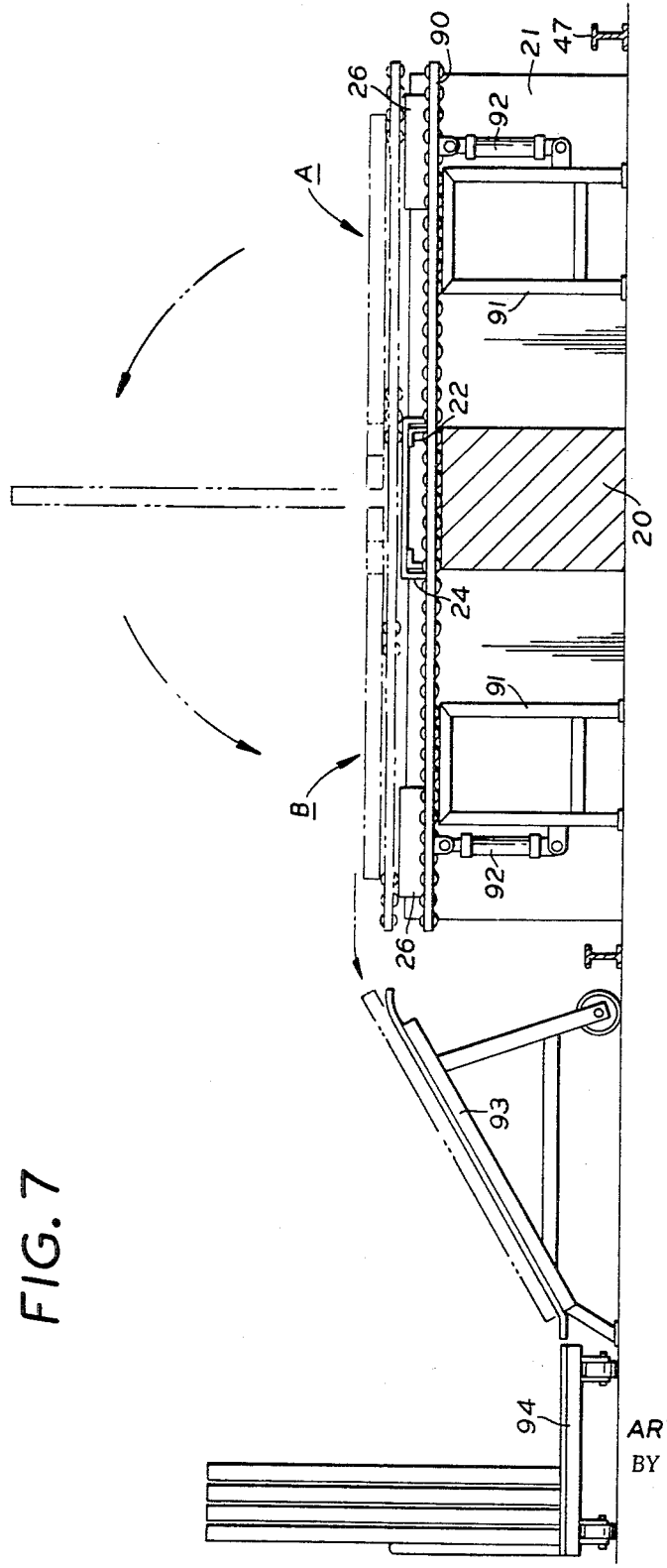
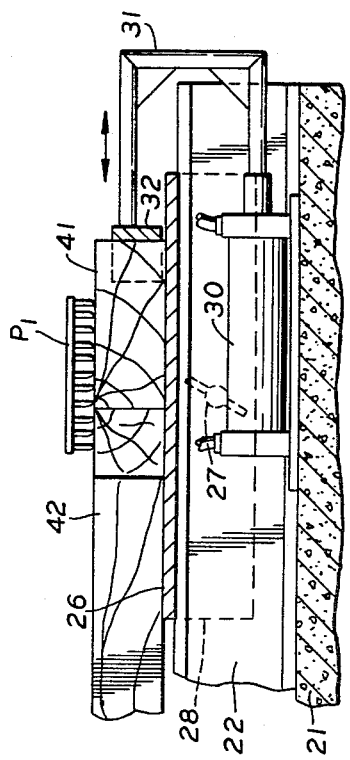
INVENTOR.
ARTHUR CAROL SANFORD
BY Hamilton & Cook
ATTORNEYS

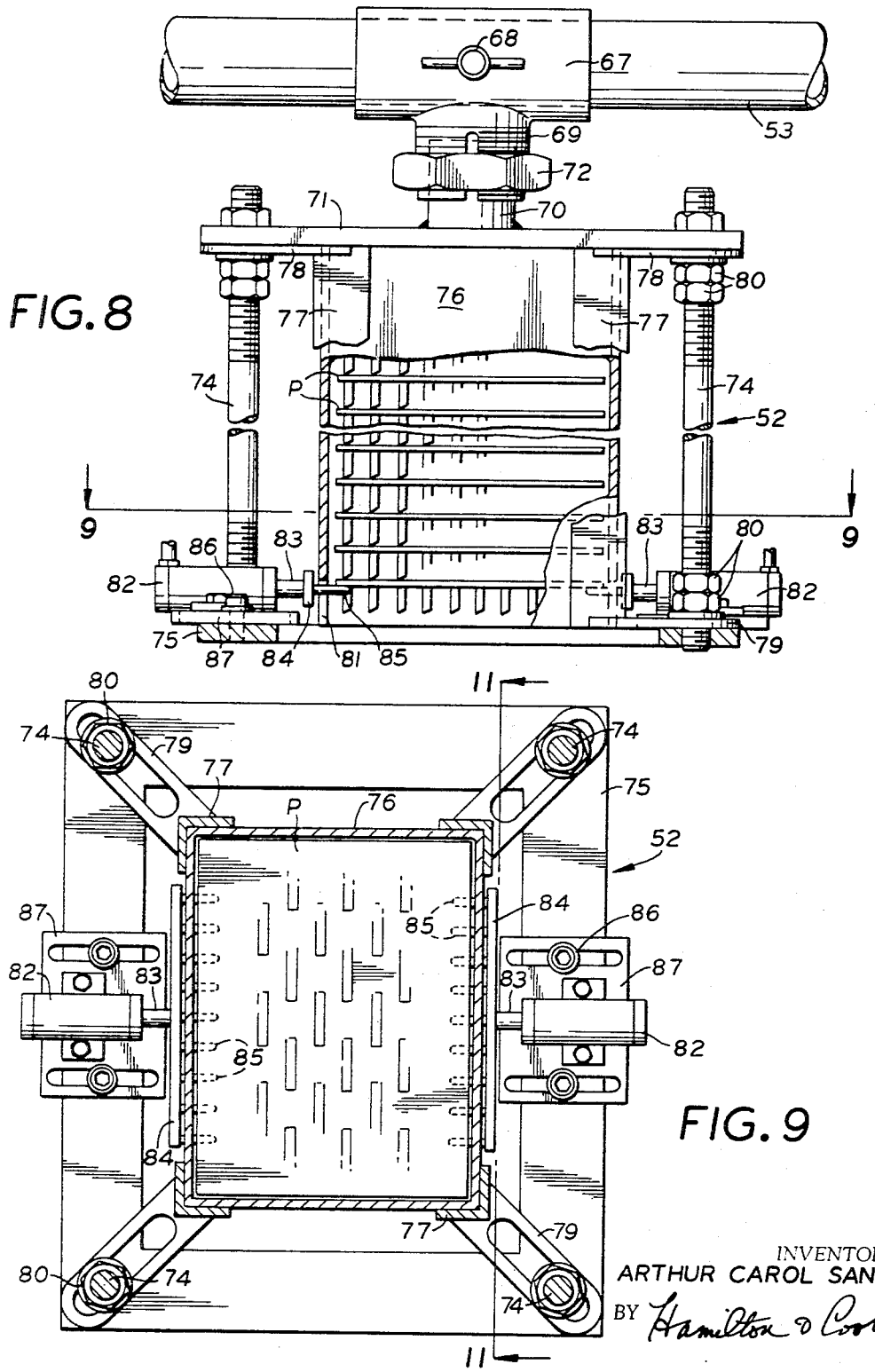

United States Patent Office 3,413,703
Patented Dec. 3, 1968

3,413,703
METHOD FOR FABRICATING TRUSSES IN HORIZONTAL POSITION
Arthur Carol Sanford, Palm Beach, Fla., assignor, by mesne assignments, to Arthur Carol Sanford, Pompano Beach, Fla.
Filed July 26, 1966, Ser. No. 567,990
2 Claims. (Cl. 29—155)

This invention relates generally to the fabrication of trusses embodying wood components connected at the joints by means of toothed metal connector plates. More particularly, this invention relates to the fabrication of wood trusses by utilizing mechanical means for sequentially positioning and applying the connector plates.

In a conventional method of fabricating such trusses, the truss components are placed on a horizontal table jig and the plates tacked by hand to one side of the truss joints. Then the truss is turned over and the plates tacked on the other side, after which the truss may be passed under a stamping press or between a pair of horizontal press rolls progressively to fully embed the teeth of the plates at the joints.

It has been proposed to avoid turning over the entire truss, and my prior Patent No. 3,212,694 shows a truss fabricating machine having a traveling or gantry roll in which a single roll passes over the top of the assembled truss to press plates on both the top and bottom of the truss joints simultaneously as it rolls progressively over the truss. However, the patent recognizes that this operation may only partially embed the teeth, and provides a final pair of stationary rolls through which the truss is passed to fully embed the teeth.

It has been attempted to fully embed the connector plates on both sides of the joints without turning the truss over, using a single gantry roller, but the plates tend to curl at their leading and trailing edges. This tendency has been largely overcome by increasing the diameter of the roll, but the teeth on the undersides of the joints do not become fully embedded, even though the roll pressure is increased, while those on the top side do.

The present invention utilizes a relatively large diameter roller to embed the top plates without material curling thereof, but does require turning the truss over and rolling it again to embed the plates on the other side. However, an important purpose is accomplished as two side-by-side trusses are rolled simultaneously so that after the first pass, each pass produces a finished truss.

These and other objects are accomplished by the improvements comprising the present invention, as described in detail herein and shown in the accompanying drawings, and defined in the appended claims. Various modifications and changes in details of construction are comprehended within the scope of the appended claims.

Referring to the drawings:

FIG. 3 is a plan section on line 3—3 of FIG. 1 showing the components of the first truss in place before the plate magazines are lowered.

FIG. 4 is a plan section on line 4—4 of FIG. 1, showing two trusses side by side with plates positioned thereon, one truss having been turned over after having plates applied to its upper side.

FIG. 5 is an enlarged vertical section on line 5—5 of FIG. 4, showing a pressure pad supporting a truss joint.

FIG. 6 is an enlarged vertical section on line 6—6 of FIG. 4 showing a pressure pad supporting a truss joint.

FIG. 7 is a vertical section on line 7—7 of FIG. 4 showing the truss unloading means.

FIG. 8 is an enlarged side elevation, partly in section, of one of the improved plate magazines and holder.

FIG. 9 is a horizontal section on line 9—9 of FIG. 8.

Figure 1:
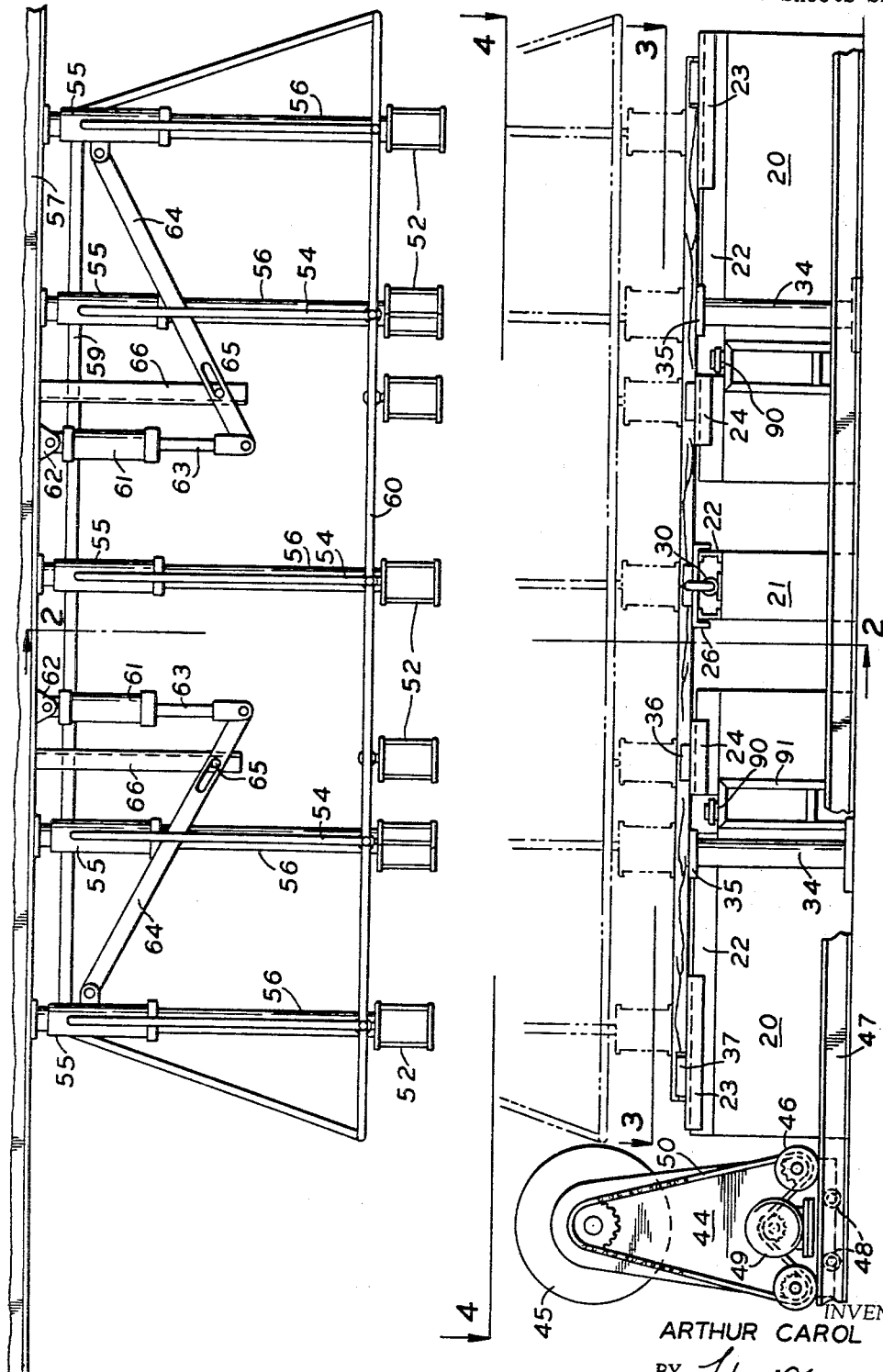
FIG. 1 is a side elevation of the improved apparatus showing the novel plate magazine means in raised position in full lines, and in lowered position in chain lines.

Referring to FIGS. 1–4, the improved apparatus includes a table jig having longitudinally aligned center beams 20 and a transverse central beam 21 passing between the inner ends of said center beams. Both the beams 20 and 21 may be of concrete construction faced with metal angles or channels 22 along their upper corners.

At their outer ends the beams 20 have table top plates or pressure pads 23 supported thereon, and adjacent their inner ends are similar top plates 24. The plates 23 are adapted to support the heel joints of trusses assembled thereon and the plates 24 are adapted to support the joints at the quarter points.

At the center of the transverse beam 21 is a top plate 25 for supporting the central part of the bottom chord of a truss, and on the outer ends of beam 21 are movable top plates 26 for supporting the peak joints of two trusses assembled side by side with their bottom chords opposing each other and overlying the beams 20, as shown in FIG. 4.

All of the top plates 23, 24, 25 and 26 are in the same horizontal plane and plates 23, 24 and 25 are substantially extensive in area so as to accommodate variations in the span of the trusses being assembled. Additionally, the plates 26 are adjustable along the channels 22 of the beams 21 to accommodate the peak joints of trusses of various pitch.

Referring to FIGS. 5 and 6, the plates 26 are held in adjusted position by screw studs 27 screwed through the flanges 28 and abutting channels 22. Fluid cylinders 30 are supported on the beam 21 between the channels 22 and actuate reverse rod pistons 31 having clamping plates 32 at their free ends to push against the outer surfaces of the peak joints of assembled trusses.

Additional pressure pad supports 34 are provided for the quarter points on the top chords of the two trusses being assembled. These supports may be movable stands to accommodate different locations for a variety of sizes and kinds of trusses. Obviously, the top plates 35 of the stands are at the same horizontal level as the top plates 23–26.

Upstanding abutment bars 36 and 37 are provided on all of the top plates 23 and 24 for abutting the side edges of the truss components and holding them in assembled position. Any suitable and well known means (not shown) may be provided for adjustably mounting said bars 36 on the top plates.

In assembling trusses on the table jig thus far described a single truss is first assembled in position A, as shown in FIG. 3, by placing the bottom chord 40 along one side of the top of beams 20, with the abutment bars against its inner edge. The top chords 41 are then placed in position with their abutting ends at the peak and the bars 37 in abutment with their other ends. The internal components 42 and 43 are placed in position. The reverse piston 31 is then operated to actuate clamping plate 32 to hold the truss components together in tight abutment.

Toothed connected plates, as indicated at $P_1$ in FIG. 4, are now applied to the upper surfaces of the truss joints and the large traveling gantry or pressure roll 45 is passed across the truss to embed the teeth of all the plates into the top of the truss in a single pass. The roll 45 is carried on a carriage comprising end frame members 44 mounting flanged wheels 46 rolling on flanged rails 47, and having bogie wheels 48 engaging the undersides of the rails to hold the gantry down on the rails as the roll 45 passes over the plates and embeds the teeth into the wood. The wheels 46 and the roll 45 may be driven by an electric motor 49 and drive chain 50.

After the truss in position A has thus had plates $P_1$ rolled into the top surfaces of the joints the truss is turned over to the position B and another truss is assembled in the position A. A set of plates $P_1$ is placed on the top of the newly assembled truss, and another set of plates $P_2$ is simultaneously placed on the top of the truss in position B (already having a set of plates $P_1$ on its bottom side). Now the roll 45 is passed over the two trusses and embeds all of the plates $P_1$ and $P_2$ in one pass.

The mechanism for mechanically placing all the plates $P_1$ and $P_2$ simultaneously will now be described.

Figure 2:
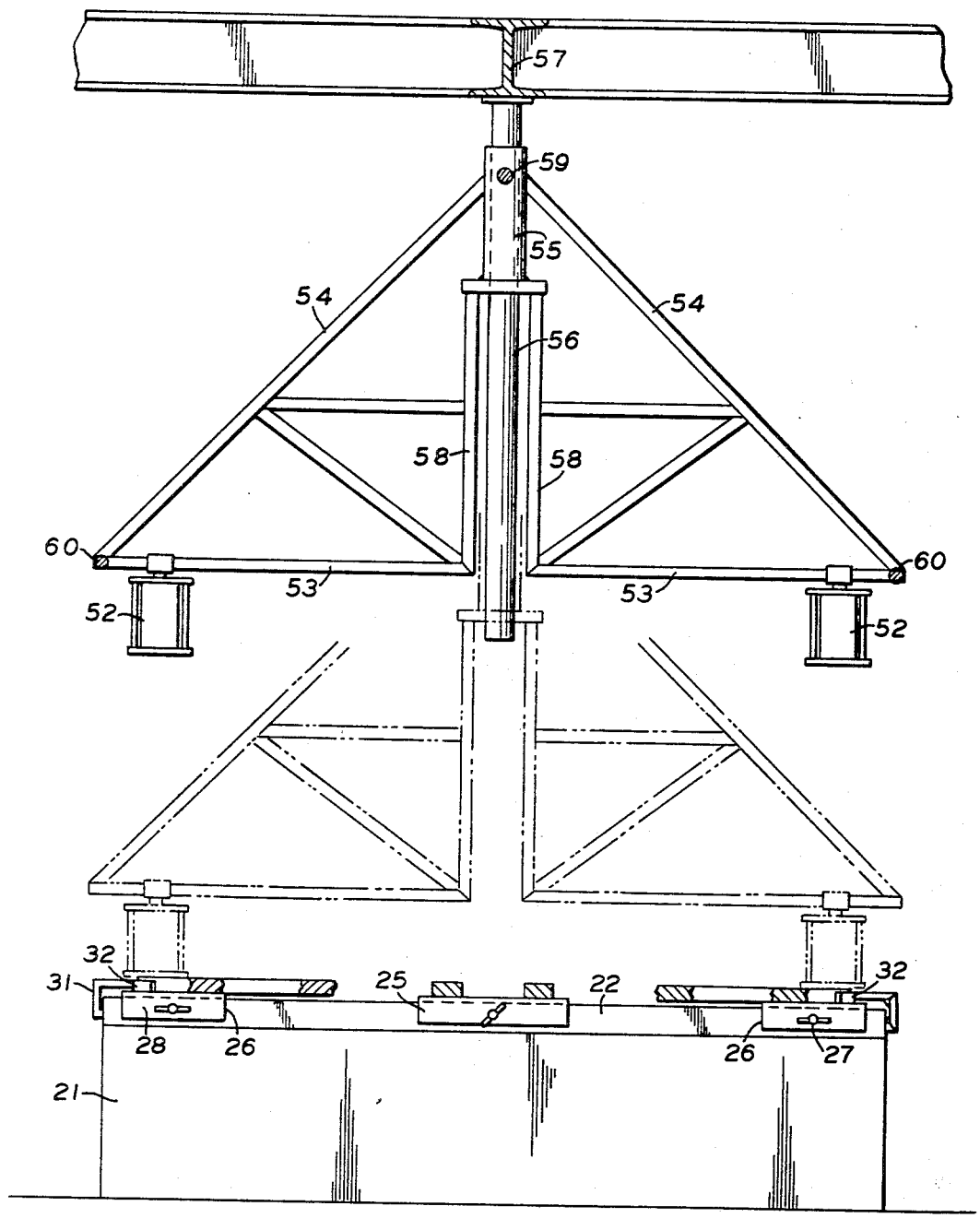
FIG. 2 is a vertical section on line 2—2 of FIG. 1.
Figure 10:
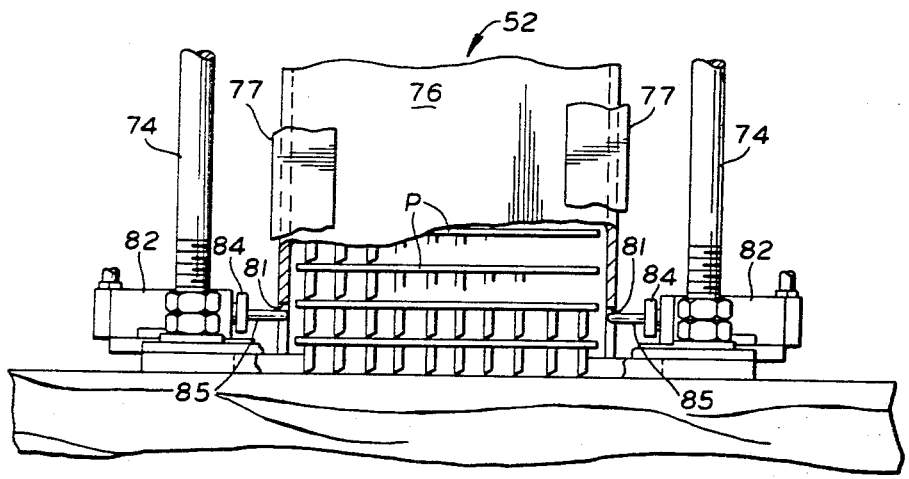
FIG. 10 is a view similar to FIG. 8 showing a plate being released from its magazine.
Figure 11:
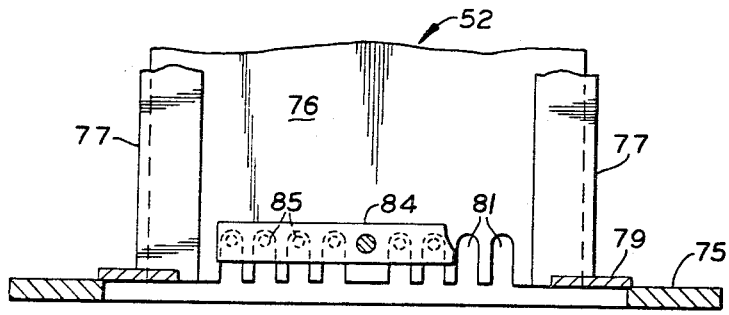
FIG. 11 is a vertical section on line 11—11 of FIG. 9.
Figure 12:
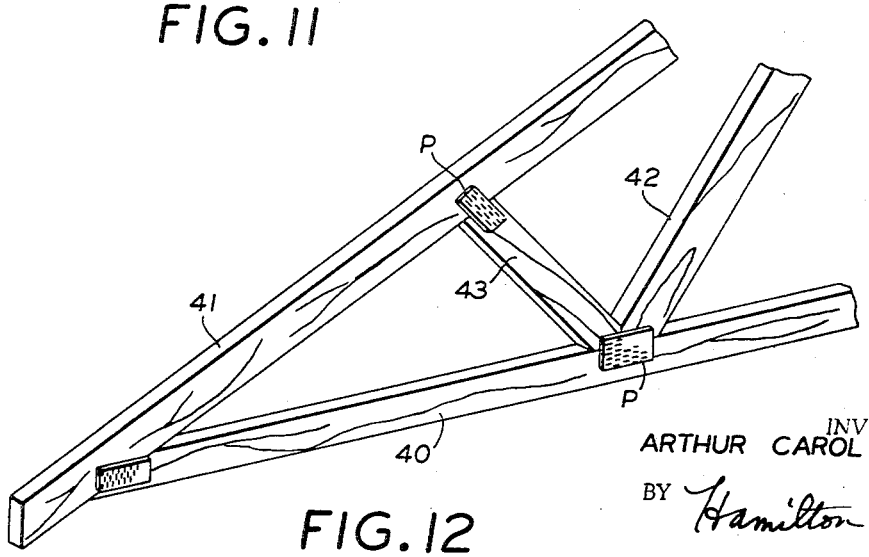
FIG. 12 is a partial perspective view of a finished truss fabricated according to the present invention.

A plurality of connector plate magazines 52 is suspended above the table jig on which the trusses are assembled, there being one magazine for each truss joint. As shown in FIGS. 1 and 2, magazines 52 are adjustably supported on or hung in pairs from horizontal pipe bars 53 each forming part of a triangular framework having upwardly inclined pipes 54 connecting the outer ends of pipes 53 with upper cylinders 55 telescopically slidable on vertical posts 56. The posts 56 depend from an upper supporting beam 57. The frameworks preferably include vertical pipes 58 connecting the cylinders 55 with the inner ends of pipes 53.

The cylinders 55 are all tied together with upper horizontal bars 59, and the frameworks are tied together with lower horizontal pipes 60, so that all of the frameworks may be raised and lowered in unison. The means for raising and lowering the frameworks and the magazines 52 carried thereby preferably includes two fluid cylinders 61 suspended from the upper beam 57. As shown, the cylinders may be pivoted on brackets 62 on the beam 57, with their piston rods 63 depending therefrom. The piston rods 63 are connected by levers 64 to two of the cylinders 55, the levers each having a slot and pin pivot connection 65 with bars 66 depending from beam 57.

Accordingly, actuating the piston rods 63 will swing the levers 64 about the pivots 65 to lower the framework and the plate magazines 52 from the full line position in FIG. 1 to the chain line position in which the magazines rest on the joints of the assembled trusses.

Referring to FIGS. 8 and 9, each plate magazine 52 preferably comprises a pipe bracket 67 slidable on the pipe 53 and having a set screw 68 for clamping the bracket in adjusted position. The bracket has a threaded depending neck 69 to which a stub 70 on the top plate 71 of the magazine is removably connected by a clamping nut 72.

The top plate 71 is connected at the corners by four vertical bolts 74 to a rectangular base plate 75 surrounding the rectangular magazine housing 76 enclosing a stack of toothed connector plates P. The four corners of housing 76 are embraced by vertical angles 77, and upper and lower diagonal slotted bars 78 and 79 respectively, adjustably connect the angles 77 to the bolts 74. The bars 78 and 79 are secured to the bolts by nuts 80. Thus, by operation of nuts 80, various sizes and shapes of magazine housings can be mounted between the top and bottom plates 71 and 75.

The mechanism for releasing the bottom plate in each stack in the magazines is shown in FIGS. 8–11. On opposite sides the housings have rows of slotted openings 81 along their bottom edges. Exteriorly of said openings are fluid cylinders 82 having pistons 83 with cross bars 84 on their outer ends facing the slotted openings. Pins 85 extend from the cross bars, one for each opening, and these pins normally extend through the openings, as shown in FIGS. 8 and 9 and engage under the lowermost plate P, thereby supporting the entire stack of plates. As shown, the fluid cylinders 82 are adjustably mounted on the base plate 75 by bolts 86 extending through slots in the cylinder mounting plates 87.

In the operation of the plate positioning mechanism, when the truss components are assembled in positions A and B, the fluid cylinders 61 are operated to lower all of the magazines onto the tops of the trusses, the magazines having been previously positioned on the suspending framework to register with the truss joints. When the base plates 75 of the magazines abut the top of the trusses, the fluid cylinders 82 are actuated to withdraw the holding pins 85 to the position of FIG. 10, allowing the stack of plates to drop so that the teeth of the lowermost plate engage the top surfaces of the truss components at the joints. Then the cylinders are reversely actuated to engage the pins under the next plate above, and the whole magazine framework is raised.

The gantry roll is then passed over the two trusses to fully embed the teeth of all the plates $P_1$ and $P_2$ (FIG. 4). The truss at position B now has plates applied on both sides and can be unloaded or removed, and the truss at position A turned over to position B to make room for a new truss at position A prior to the next application of plates.

Mechanism to aid in unloading trusses from piston B and in turning trusses from position A to position B is provided and includes a pair of supporting roller bars 90 normally resting on tables 91 below the truss components, and attached to fluid cylinders 92 on the tables for raising and lowering the ends of the bars 90 a limited amount.

When a truss at position B has had plates rolled on both sides, and a truss at position A has had plates rolled on its upper side, the cylinders 92 are actuated to raise the trusses by raising the roller bars 90 to the chain line position shown in FIG. 7. In this position the truss at position B is easily pushed laterally on to the inclined unloading chutes 93, and thence onto a dolly 94 or the like. Also, the truss at position A can be manually turned over by first raising it to the vertical position indicated in chain lines, after which the roller bars 90 are lowered and a new truss assembled in position A.

The present invention provides for rapidly making successive trusses by mechanically feeding connector plates from supply magazines at all the joints of two side-by-side trusses simultaneously, embedding the plates during one pass of a traveling roller press, and making a finished truss with one pass of the roller press.

What is claimed is:
1. The method of fabricating trusses having wood components connected together in one plane by toothed connector plates on opposite sides of each truss joint, comprising the steps of:
 assembling the components of a first truss in horizontal side-by-side relation to a second truss having connector plates applied to the joints on its underside,
 depositing connector plates on the top sides of all joints of both trusses simultaneously,
 embedding the teeth of all top side plates by passing a roller press thereover,
 removing said second truss having plates on both sides, and inverting said first truss and placing it in the position previously occupied by said second truss.

2. The method according to claim 1 in which pressure is applied in a horizontal plane to the assembled components of each of said trusses to hold them in tight abutment while applying and rolling the plates thereon.

References Cited

UNITED STATES PATENTS

| | | | |
|---|---|---|---|
| 3,212,694 | 10/1965 | Sanford | 29—429 X |
| 3,255,943 | 6/1966 | Sanford | 227—152 |
| 3,358,348 | 10/1967 | McGlinchey | 29—155 |

THOMAS H. EAGER, *Primary Examiner.*